March 26, 1935.  H. J. DILLON  1,995,500
SPRING AND AXLE CONSTRUCTION FOR VEHICLES
Filed July 24, 1933
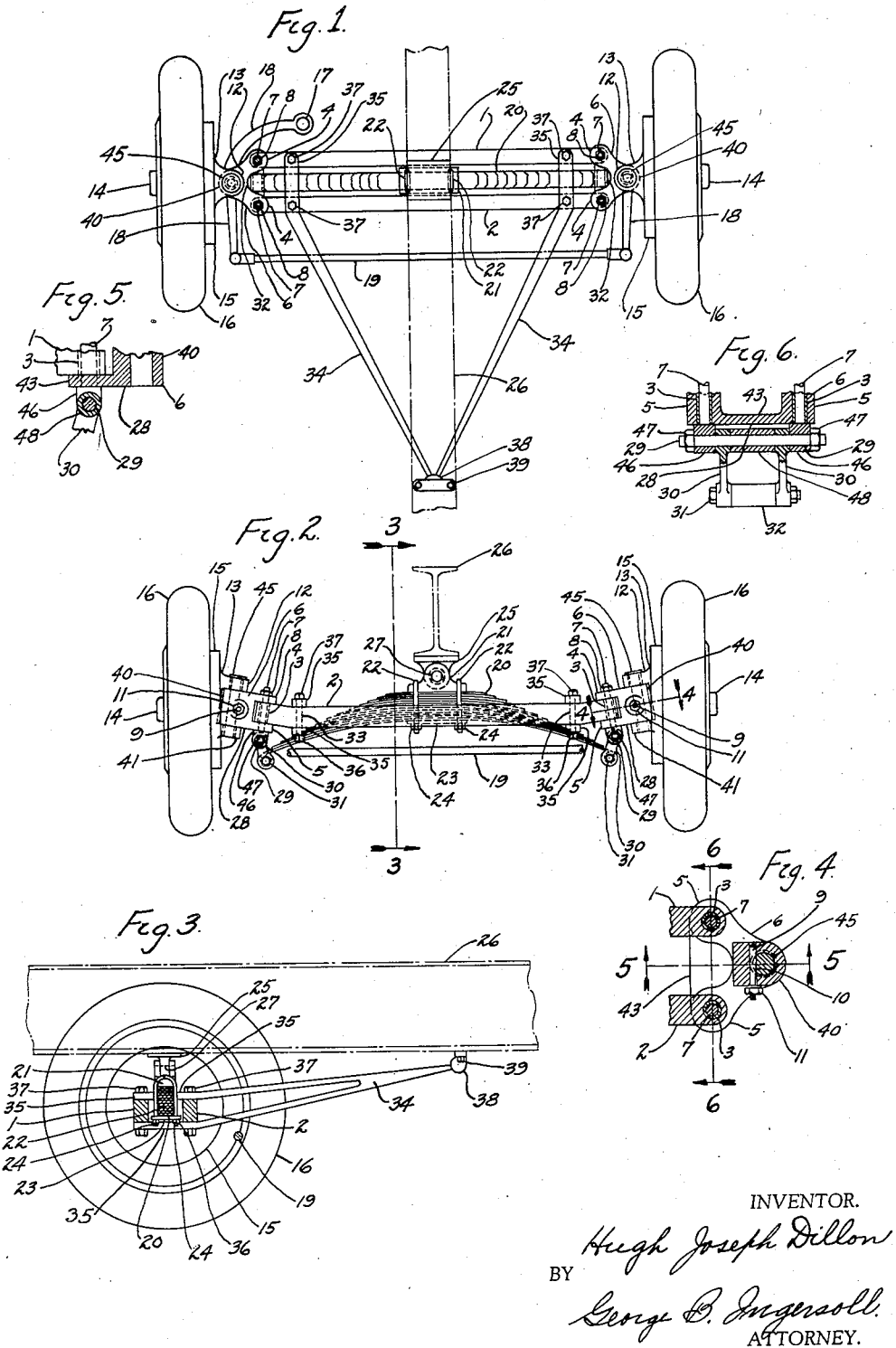
INVENTOR.
Hugh Joseph Dillon
BY
George B. Ingersoll
ATTORNEY.

Patented Mar. 26, 1935

1,995,500

UNITED STATES PATENT OFFICE 1,995,500

SPRING AND AXLE CONSTRUCTION FOR VEHICLES

Hugh Joseph Dillon, Highland Park, Mich.

Application July 24, 1933, Serial No. 681,849

4 Claims. (Cl. 280—112)

My invention relates to improvements in a spring and axle construction for vehicles; and the objects of my improvement are, first to provide a heavy spring and axle construction utilizing parts of a pair of lighter duty axles; second, to provide an axle having a pair of axle beam members; third, to provide a spring and axle construction having its spring member operatively located between a pair of axle beam members; fourth, to provide a spring and axle construction having a pair of axle beam members secured together at their ends by a spring supporting member; fifth, to provide a spring and axle construction having a resilient member so operatively mounted thereon to provide for a very low center of gravity for the loads carried on the resilient member; and sixth, to provide a spring and axle construction having a pair of beam members operatively connected with a torque member.

I attain these objects by the mechanism illustrated in the accompanying drawing, in which—

Figure 1 is a plan view of the spring and axle construction together with a frame member; Fig. 2, a rear view of the spring and axle construction disclosed in Fig. 1; Fig. 3, a sectional view taken on the line 3—3, Fig. 2; Fig. 4, a partial sectional view of the end of the axle members and the axle beam end yoke member, said partial sectional view being taken on the line 4—4, Fig. 2; Fig. 5, a partial sectional view of the axle beam end yoke member taken on the line 5—5, Fig. 4; and Fig. 6, a sectional view through the end of the spring and one of its pivotally mounted spring shackles.

Similar numerals refer to similar parts throughout the several views.

It is to be noted that, with an ever increasing amount of legislation against the use of the heavier type of commercial truck vehicles and with the ever increasing demand for low haulage costs with a minimum initial investment, the tendency in the design and construction of motor trucks is to extend the use of low price and light weight commercial vehicles to transport heavier loads by the incorporation of six wheel units therein or by the addition of semi-trailer units operatively connected with said vehicles and the heavier loads transported in such vehicle units impose heavier loads and increased stresses in the front axle and spring construction of the vehicles.

My invention makes possible the incorporation of additional load carrying ability in the front axle and spring construction of such vehicles by using the axle beams of a pair of front axle assemblies as are ordinarily used in vehicles of this type which are constructed from the prevalent type of low priced vehicles such as the Ford, Chevrolet, or similar vehicles.

It is to be understood that whereas I disclose a spring and axle construction which is constructed from the parts of a pair of front axle assemblies such as used in the Ford motor vehicle, my design of spring and axle construction may be used to form the spring and axle construction of vehicles constructed, as above stated, from parts of units used in other commercial vehicles when constructed, rebuilt, or used as above stated, to extend and increase their carrying ability or my spring and axle design may be used as the original units designed and constructed as an integral and original portion of a commercial vehicle by the initial manufacturers thereof without departing from the spirit and scope of the claims of my invention.

The beam members 1 and 2, as removed from the conventional Ford axle assemblies, are provided at their ends with the bushings 3, in which fits and operates the usual or conventional spindle pin or king bolt of the front axle assembly. The ends of the beam members 1 and 2 are thus adapted to fit between the upper ears or lugs 4 and the lower ears or lugs 5 of the end yoke member 6, the end yoke member 6 being secured to the beam members 1 and 2 by the bolts 7 which extend through the upper ears 4 and the lower ears 5, of the end yoke member 6, together with the bushing 3 in the ends of the beam members 1 and 2, the bolts 7 being secured by the nuts 8.

The end yoke members 6 are each provided with a boss portion 40 in which is suitably secured the spindle or king pin 45, which extends through the boss 40 and is locked therein by the pin 9 which has a tapered flat portion 10 for engaging a similar flatted portion on the king pin 45, the pin 9 being secured in position against the king pin 45 by the nut 11. The king pin 45 also extends through the upper ears or lugs 12 and the lower ears or lugs 41 of the spindle 13. The spindle 13, on which is suitably supported the hub 14 and the brake drum 15, is supported and attached to the wheels 16 in a conventional manner, the brake mechanism and the usual bearing assemblies for respectively operating with the brake drum 15 and supporting the wheel members 16 not being shown as these are of conventional construction.

It is to be noted that the spindle members 13 will thus be movably mounted on the end yoke members 6 and will pivotally move about the king pins 45 in a conventional manner, when the vehicle is travelling or when the wheel assemblies 16 are being operated by the usual steering wheel assembly (not shown), and which may be suitably connected with the steering ball member 17 on the steering arm 18.

The spindle member 13 may also be suitably provided and connected with the steering arms 18 which may be connected by the tie rod 19 which thus connects the two wheel assemblies for steering purposes.

It is to be noted that the axle beam members 1 and 2 will thus be operatively mounted and positioned to permit the spring assembly 20 to be mounted therebetween.

It is also to be noted that in order to build up the carrying ability of the wheel assemblies 16 to be consistent with the carrying capacity of the pair of axle beams 1 and 2, the conventional spring assembly of the usual low priced commercial vehicle, some parts of which are being used, as above stated, to reconstruct a heavy duty vehicle, may be replaced with a spring of greater capacity to be consistent with the rest of the design of the axle assembly. Similarly if desired, the supporting members, such as ball bearing assemblies (not shown), for operatively supporting the wheel assemblies 16 may be replaced with the bearings of heavier load capacity, to complete the axle assembly of increased carrying capacity.

It is also to be especially noted that with the installation of the spring 20 between the axle beam members 1 and 2, the spring assembly 20 may normally extend below the top of the axle beam members 1 and 2, and approximately flush or slightly above the top of the axle beam members 1 and 2, thus conserving the necessary operating clearances of the spring, relative to the axle assembly and also tending to lower the center of gravity of the forward end of the commercial vehicle.

The spring assembly 20 is secured to the spring seat 21 by the spring clips 22 and the clip plate 23, together with the clip nuts 24, the spring seat 21 being pivotally connected to the bracket 25 which may be suitably secured to the frame member 26, the spring seat 21 being adapted to pivotally move on the pin 27 which may be suitably secured in the bracket 25.

The end yoke members 6 are provided on their lower sides with the surfaces 28 against which are seated the heads 46 of the bolts 7 in which are mounted the pins 29, which may be secured therein by the nuts 47, the pins 29 pivotally supporting the spring shackles 30 through which extend the spring bolts 31, the spring bolts 31 further extending through the eyes 32 of the spring assembly 20, the spring assembly 20 thus having its ends 32 pivotally connected with the shackles 30, which are in turn pivotally connected with the end yoke members 6. The bushing or spacer 48 may be mounted on the pin 29 to space the spring shackles 30 in their operative position adjacent the heads 46.

It is to be noted that the conventional axle beam members as used in the axle assembly of the conventional Ford commercial vehicle, is provided with the holes 33 in which are suitably connected the conventional shackle mounting members for supporting the convention spring assembly of the usual axle assembly in the Ford commercial vehicle. I utilize the holes 33, which thus are already in the beam members 1 and 2, for attaching the combined torque and radius rods 34, the torque and radius rods 34 being provided with the extension portions 35 which fit across the top and bottom of the beam members 1 and 2 and are secured thereto by the bolts 36 which extend through the holes 33, the bolts 36 being locked in position by the nuts 37. The torque and radius rods 34 converge at a point at the rear of the axle assembly and adjacent the under side of the frame member 26 and are pivotally supported in the bracket 38 which may be secured to the frame member 26 by the screws 39.

It is to be noted that the torque and radius rod members 34 will thus pivotally move in the brackets 38 and allow for the up and down movement of the axle assembly relative to the frame member 26, and at the same time will provide a positive means for transmitting the driving thrust from the frame 26 of the axle assembly as well as providing means for resisting the torque reaction due to the operation of the brake assemblies (not disclosed) within the brake drums 15 and the wheels 16.

It is to be noted that whereas I have disclosed a single frame member 26 by the use of dotted lines to show its relationship to the axle assembly, my axle assembly can be installed in the usual type of frame construction in which frame side rails are located adjacent the wheels and connected by suitable frame cross members or other similar frame connecting parts.

The lower ears 5 of the axle and yoke member 6 are joined together by the flange 43 for tying the lower ears 5 together in a very secure manner to better withstand the stresses imposed upon them from the operation of the axle assembly.

It is also to be understood that the frame member 26 as disclosed in the drawing in my invention herewith, is similar to the frame member as disclosed in, and forming a part of my design and construction, claimed in the United States patent application, Serial No. 681,851, filed by me on the 24th day of July, 1933, on a Motor vehicle.

I claim:

1. In a spring and axle construction for a vehicle comprising a pair of axle beam members, together with a spring mounted therebetween, the combination of brackets connecting and spacing the ends of each of said axle beam members, bolt members for securing said brackets and said axle beam members together, said bolt means each being provided with head portions extending below said bracket members, a pin member suitably mounted in the head portions of said bolt means and extending therebetween, shackle members pivotally mounted on said pin and connected with the ends of said spring, and a spacer member mounted on said pin member and spacing said shackle members.

2. In a spring and axle construction for a vehicle comprising a frame member, the combination of a bracket supported on said frame member, a spring seat pivotally mounted on said bracket, a spring secured to said spring seat, a pair of beam members located on opposite sides of said spring and each provided with upwardly inclined ends having holes extending therethrough in a vertical plane, axle end members each provided with three boss portions, two of said boss portions being located on the longitudinal centers of said pair of beam members, the third of said boss portions being located on the longitudinal center of said spring, bolt members for securing said axle end members to the upwardly inclined ends of said pair of beam members, said bolt members extending through said holes in the upwardly inclined ends of said pair of beam members, shackle members pivotally connected with and supported between said bolt members, said shackle members being further pivotally connected with the ends of said spring, spindle members pivotally mounted on said third boss portion of said axle end members, wheel assemblies mounted on said spindle members, and a torque and radius rod mechanism connected with said pair of beam members and the frame member of the vehicle.

3. In a spring and axle construction comprising a pair of beam members together with spring and wheel supporting mechanisms, the combination of a pair of yoke members each provided with a pair of boss portions located adjacent the ends of said beam members, each of said pair of yoke members being provided with a third boss portion for connecting with the wheel supporting mechanisms, said third boss being located at a point between said pair of boss portions, said third boss portion being further located out of alignment with said pair of boss portions, bolt members extending through and securing said pair of beam members and said yoke members together, said bolt members being provided with heads at their lower ends, said heads having bores extending transversely therethrough, a shaft member supported in the bores of the heads of said bolt members and extending therebetween, and shackle members mounted on said shaft and operatively connected with said spring mechanism.

4. In a spring and axle connection comprising a pair of beam members and a spring, the combination of end members for securing the ends of said pair of beam members together, said end members being provided with boss portions for attachment with the end portions of said pair of beam members, said end members being further provided with a flange extending between the lower portions of said boss portions, means for securing said pair of beam members and said end members together, lug members supported adjacent the lower side of said flanges of said end members, and means supported by said lug members and operatively connected with the ends of said spring, the ends of said spring being thereby supported below said lug members.

HUGH JOSEPH DILLON.